United States Patent
Czubarow et al.

(10) Patent No.: US 12,304,818 B2
(45) Date of Patent: May 20, 2025

(54) POROUS CARBON AND RESIN COMPOSITION

(71) Applicant: NAMICS CORPORATION, Niigata (JP)

(72) Inventors: Pawel Czubarow, Wellesley, MA (US); Yoshitaka Kamata, Niigata (JP); Toshiyuki Sato, Niigata (JP)

(73) Assignee: NAMICS CORPORATION, Niigata (JP)

( * ) Notice: Subject to any disclaimer, the term of this patent is extended or adjusted under 35 U.S.C. 154(b) by 853 days.

(21) Appl. No.: 17/600,870

(22) PCT Filed: Feb. 13, 2020

(86) PCT No.: PCT/JP2020/005476
§ 371 (c)(1),
(2) Date: Oct. 1, 2021

(87) PCT Pub. No.: WO2020/202819
PCT Pub. Date: Oct. 8, 2020

(65) Prior Publication Data
US 2022/0185667 A1    Jun. 16, 2022

Related U.S. Application Data

(60) Provisional application No. 62/829,391, filed on Apr. 4, 2019.

(51) Int. Cl.
C01B 32/05    (2017.01)
C08L 63/00    (2006.01)
H01C 7/105    (2006.01)

(52) U.S. Cl.
CPC .............. C01B 32/05 (2017.08); C08L 63/00 (2013.01); H01C 7/105 (2013.01);
(Continued)

(58) Field of Classification Search
CPC ......... C01B 32/05; C01B 32/00; C08L 63/00; C08L 2203/20; C08L 101/00;
(Continued)

(56) References Cited

U.S. PATENT DOCUMENTS 6,064,560 A    5/2000    Hirahara et al.
2010/0226701 A1    9/2010    Moorlag
(Continued)

FOREIGN PATENT DOCUMENTS

EP    2306561 A1    4/2011
JP    H09328308 A    12/1997
(Continued)

OTHER PUBLICATIONS

Japanese Office Action (and an English language translation thereof) dated Nov. 7, 2023, issued in counterpart Japanese Application No. 2021-511180.
(Continued)

Primary Examiner — Daniel C. McCracken
(74) Attorney, Agent, or Firm — Holtz, Holtz & Volek PC

(57) ABSTRACT

A porous carbon has an $I_D/I_G$ of 2.0 or more in a Raman spectrum measured by Raman spectroscopy with respect to the porous carbon wherein the $I_G$ is an accumulated intensity of a peak for G band around 1590 $cm^{-1}$, and the $I_D$ is an accumulated intensity of a peak for D band around 1350 $cm^{-1}$. The porous carbon has pores having a size of less than 1 μm. The porous carbon can be contained in a resin composition for producing a varistor element.

11 Claims, 5 Drawing Sheets

(52) U.S. Cl.
CPC ...... *C01P 2002/82* (2013.01); *C01P 2004/03* (2013.01); *C01P 2006/14* (2013.01); *C08L 2203/20* (2013.01)

(58) Field of Classification Search
CPC .... H01C 7/105; H01C 7/118; H01C 17/0652; H01C 17/06586; C01P 2002/82; C01P 2004/03; C01P 2006/14; C01P 2006/16; C08K 3/04
See application file for complete search history.

(56) References Cited

U.S. PATENT DOCUMENTS

| | | |
|---|---|---|
| 2010/0288160 A1 | 11/2010 | Maisels et al. |
| 2011/0135990 A1* | 6/2011 | Yamamoto .............. H01M 4/58 29/623.1 |
| 2011/0226616 A1 | 9/2011 | Takasu et al. |
| 2013/0130115 A1 | 5/2013 | Park et al. |
| 2013/0252082 A1 | 9/2013 | Thompkins et al. |
| 2016/0225540 A1 | 8/2016 | Gadkaree et al. |
| 2018/0197663 A1 | 7/2018 | Kamata et al. |
| 2020/0044261 A1 | 2/2020 | Ijima et al. |
| 2021/0155769 A1 | 5/2021 | Kamata |

FOREIGN PATENT DOCUMENTS

| | | |
|---|---|---|
| JP | 2006265091 A | 10/2006 |
| JP | 2007016160 A | 1/2007 |
| JP | 2010211207 A | 9/2010 |
| JP | 2010251283 A | 11/2010 |
| JP | 2011509909 A | 3/2011 |
| JP | 2011184749 A | 9/2011 |
| JP | 2013110112 A | 6/2013 |
| JP | 2018511162 A | 4/2018 |
| WO | 2018182048 A1 | 10/2018 |

OTHER PUBLICATIONS

International Search Report (ISR) (and English language translation thereof) dated Apr. 21, 2020 issued in International Application No. PCT/JP2020/005476.

Written Opinion dated Apr. 21, 2020 issued in International Application No. PCT/JP2020/005476.

* cited by examiner

POROUS CARBON AND RESIN COMPOSITION

FIELD OF THE INVENTION

The present invention relates to a porous carbon which can be used as a material for electric elements, such as a varistor element, and a resin composition comprising the porous carbon.

BACKGROUND ART

Patent documents 1 to 5 have a description of a technique using a carbon aerogel.

Patent document 6 has a description of a resin composition comprising a carbon nanotube, wherein the amount of a semiconductor single-walled carbon nanotube in the carbon nanotube is 70% by weight or more. Further, patent document 6 has a description of a paste for forming a varistor element, the paste comprising the above-mentioned resin composition.

Patent document 1: JP 2010-211207 A
Patent document 2: JP 2007-016160 A
Patent document 3: JP 2006-265091 A
Patent document 4: JP Hei 09-328308 A
Patent document 5: JP 2011-509909 A
Patent document 6: US 2018/0197663 A

DISCLOSURE OF THE INVENTION

The varistor element is an element (an electronic component) having properties such that it has a high electric resistance when a voltage between a pair of electrodes is low, and the electric resistance is rapidly reduced when the voltage between the electrodes is increased to a predetermined value or more. Generally, the varistor element has a structure in which a material having non-linear resistance characteristics is disposed between a pair of electrodes. Examples of materials having non-linear resistance characteristics include silicon carbide, zinc oxide, strontium titanate, and the like.

For improving the varistor element in performance and achieving reduction of the cost of the varistor element, it is necessary to find and develop a new material for a varistor element.

An object of the present invention is to provide a resin composition for producing a varistor element having appropriate varistor characteristics using a material that has conventionally not been known to have varistor characteristics. Another object of the present invention is to provide a porous carbon that is to be contained in a resin composition for producing a varistor element.

For solving the above-mentioned problems, the present invention gas the following configurations.

(Configuration 1)

Configuration 1 of the present invention s a porous carbon,
wherein the porous carbon has an ID/IG of 2.0 or more in a Raman spectrum measured by Raman spectroscopy with respect to the porous carbon, the IG is an accumulated intensity of a peak for G band around 1590 $cm^{-1}$, and the ID is an accumulated intensity of a peak for D band around 1350 $cm^{-1}$, and
the porous carbon has pores having a size of less than 1 μm, and
the porous carbon is the porous carbon for the varistor element.

By using the porous carbon of configuration 1 of the present invention, a resin composition for producing a varistor element having appropriate varistor characteristics and a paste for forming a varistor element can be obtained.

(Configuration 2)

Configuration 2 of the present invention is the porous carbon of configuration 1, wherein the porous carbon has an MD/MG of 0.80 or more, and the MG is a maximum intensity of a peak for the G band, and the MD is a maximum intensity of a peak for the D band.

By using the porous carbon of configuration of the present invention, a resin composition for producing a varistor element having appropriate varistor characteristics and a paste for forming a varistor element can be more surely obtained.

(Configuration 3)

Configuration 3 of the present invention is the porous carbon of configuration 1 or 2, wherein the peak temperature of the thermal decomposition when producing the porous carbon is 800 to 1500 degree C.

By configuration 3 of the present invention, a porous carbon that is to be contained in a resin composition and the like for producing a varistor element having appropriate varistor characteristics can be more surely obtained.

(Configuration 4)

Configuration 4 of the present invention is the porous carbon of any one of configurations 1 to 3, wherein the porous carbon is produced by thermal decomposition of a mixture of raw materials containing furfural and phloroglucinol.

By configuration 4 of the present invention, a porous carbon that is to be contained in a resin composition and the like for producing a varistor element having appropriate varistor characteristics can be further surely obtained.

(Configuration 5)

Configuration 5 of the present invention is the porous carbon of configuration 4, wherein the amount of the furfural in the raw materials is 100 to 500 parts by weight, relative to 100 parts by weight of the phloroglucinol.

By configuration 5 of the present invention in which the amount of the furfural relative to the phloroglucinol is in an appropriate range, a porous carbon that is to be contained in a resin composition and the like for producing a varistor element having appropriate varistor characteristics can be more easily obtained.

(Configuration 6)

Configuration 6 of the present invention is the porous carbon of any one of configurations 1 to 3, wherein the porous carbon is produced by thermal decomposition of a raw material containing a polyimide.

By configuration 6 of the present invention in which a polyimide is used as a raw material, a porous carbon that is to be contained in a resin composition and the like for producing a varistor element having appropriate varistor characteristics can be more surely obtained.

(Configuration 7)

Configuration 7 of the present invention is a resin composition comprising the porous carbon of any one of configurations 1 to 6 and a resin.

By using the resin composition of configuration 7 of the present invention, a varistor element having appropriate varistor characteristics can be produced.

In the present invention, a resin composition for producing a varistor element having appropriate varistor characteristics using a material that has conventionally not been known to have varistor characteristics can be provided.

Further, in the present invention, a porous carbon that is to be contained in a resin composition for producing a varistor element can be provided.

MODE FOR CARRYING OUT THE INVENTION

As described below, an embodiment of the present invention will be described in detail with reference to the drawings. The following embodiment embodies the present invention, and should not be construed as limiting the scope of the present invention.

The porous carbon of the present embodiment is a porous carbon for a varistor element. The porous carbon of the present embodiment has pores having a size of less than 1 µm.

In the present specification, the term "porous carbon" means a carbon with porosity that is obtained by that the solvent contained in a gel-like mixture made from a material containing carbon is replaced with a gas by supercritical drying, and components other than carbon are removed by thermal decomposition. Such porous carbon is generally called a carbon aerogel.

The porous carbon has a number of pores due to the production method therefor. The pores have a size of less than 1 µm, and the pores (nanopores) have a size of the order of nanometer. Generally, the size of the nanopores of porous carbon is 200 to 300 nm. The dimensions of the pores can be obtained as the average of the diameters of the plurality of pores in the SEM photograph using the SEM photograph obtained by photographing the cross section of the porous carbon with a scanning electron microscope (SEM). Diameters of the all pores seen in the SEM micrograph can be measured to determine an average of the diameters. Alternatively, diameters of, for example, 10 to 20 pores can be measured to determine an average of the diameters as a size of the pores.

As mentioned above, the porous carbon of the embodiment of the present invention has nanopores having a size of the order of nanometer, and the porous carbon of the embodiment may be referred to as "nanoporous carbon" in order to distinguish it from general porous carbon.

The porous carbon of the present embodiment can be advantageously used as porous carbon for a varistor element.

Figure 1:
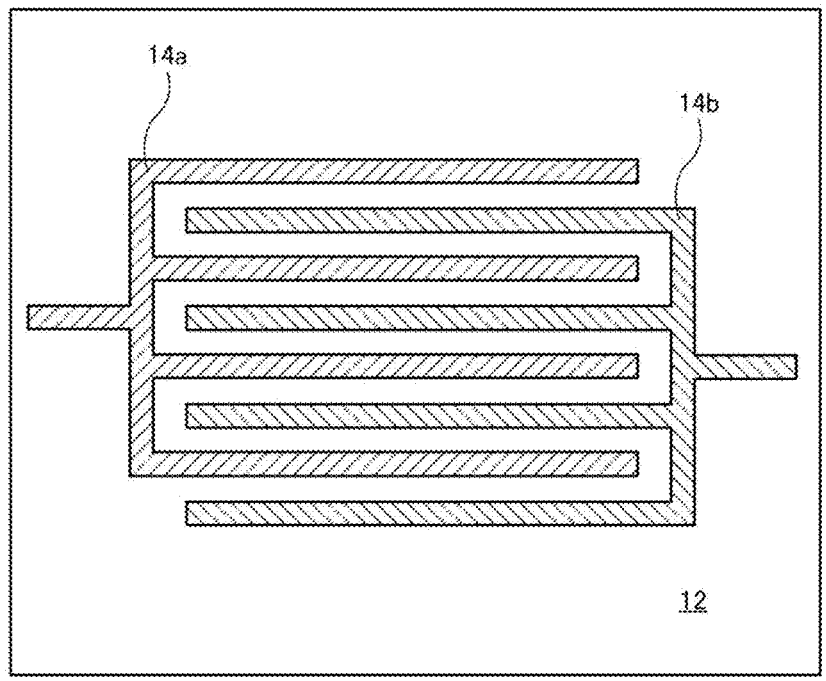
FIG. 1 is a schematic plan view of the electrodes used in the varistor element the Examples of the present invention.
Figure 2:
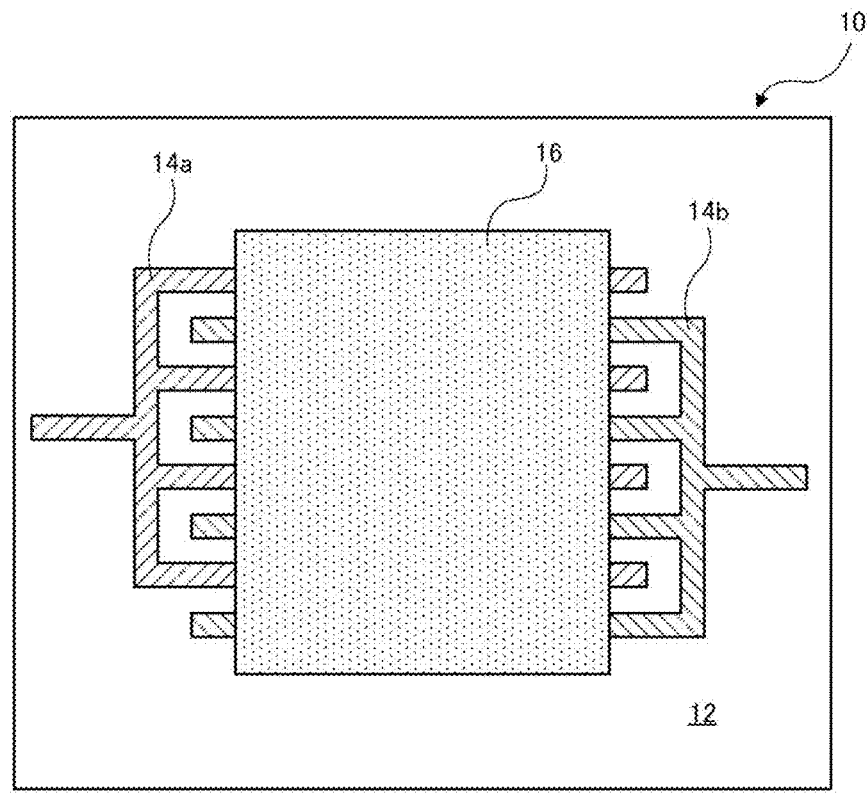
FIG. 2 is a schematic plan view of the varistor element in the Examples of the present invention.

FIG. 2 shows a schematic view of an example of a varistor element. The varistor element shown in FIG. 2 has a structure in which a material having varistor characteristics (for example, the resin composition of the present invention) is disposed on a pair of electrodes 14a and 14b shown in FIG. 1. The structure of the varistor element shown in FIG. 2 is merely an example, and any structure can be employed as long as it is the structure in which a material having varistor characteristics is disposed between a pair of electrodes. For example, a structure in which a material having varistor characteristics is disposed between electrodes arranged so that the planes are parallel to each other, and a structure in which a pair of electrodes are three-dimensionally arranged in a comb-like form, and the like can be adopted.

The varistor element is an electronic element having non-linear resistance characteristics. The relationship between a voltage V applied to a pair of electrodes 14a and 14b of the varistor element and a current I flowing between the terminals at that time can be approximated as $I=K \cdot V^\alpha$ wherein K is a constant. This $\alpha$ is a non-linear coefficient. A general ohmic resistor has a coefficient of $\alpha=1$, but a varistor element has a coefficient of $\alpha>1$. When the varistor element has a non-linear coefficient $\alpha$ of 6 or more, the varistor element is considered to have appropriate varistor characteristics that can be used as a varistor element.

By using the resin composition of the present invention, a varistor element having varistor characteristics appropriate to the use as a varistor element, i.e., a varistor element having a non-linear coefficient $\alpha$ of 6 or more can be produced.

The porous carbon according to the embodiment is described below in detail.

The porous carbon of the present embodiment is porous carbon for a varistor element. The porous carbon of the present embodiment has an $I_D/I_G$ of 2.0 or more in a Raman spectrum measured by Raman spectroscopy with respect to the porous carbon wherein the $I_G$ is an accumulated intensity of a peak for G band around 1590 $cm^{-1}$, and the $I_D$ is an accumulated intensity of a peak for D band around 1350 $cm^{-1}$. By using the porous carbon of the present, invention, a resin composition for producing a varistor element having appropriate varistor characteristics and a paste for forming a varistor element can be obtained.

The porous carbon of the present invention has a predetermined Raman spectrum when an intensity of Raman scattering for a wavenumber (unit: generally $cm^{-1}$) of Raman scattering (Raman shift) is measured by Raman spectroscopy. Generally, a material comprised of carbon has peaks appearing around 1590 $cm^{-1}$ and around 1350 $cm^{-1}$ due to the bonding states of carbon. The peak appearing around 1590 $cm^{-1}$ is considered to be a peak for G band derived from a $sp^2$ hybrid orbital, such as the bonding state of graphite. The peak appearing around 1350 $cm^{-1}$ is considered to be a peak for D band derived from a $sp^3$ hybrid orbital, such as the bonding state of diamond. D band is considered to be caused due to diamond-like amorphous carbon, and therefore the higher intensity of D band is considered to show that the bonding state of graphite is disordered. The porous carbon of the present invention has a characteristic feature that the porous carbon has an $I_D/I_G$ of 2.0 or more wherein the $I_G$ is an accumulated intensity of a peak for G band around 1590 cm$^{-1}$, and the $I_D$ is an accumulated intensity of a peak for D band around 1350 cm$^{-1}$. The $I_D/I_G$ is preferably 2.1 to 3.0, more preferably 2.2 to 2.5.

The accumulated intensity of a peak for G band is an area of the peak obtained by subtracting the background, which is a noise, from a peak for G band in a Raman spectrum that plots the intensity of Raman scattering with respect to the wave number of Raman scattering. The accumulated intensity of a peak for D band is similarly determined. The peak for G band and the peak for D band are close to each other, and therefore the peak for G band and the peak for D band can be separated by peak fitting using an appropriate function, such as a Lorentzian function. Such a peak separation method has been known.

The porous carbon of the present invention preferably has an $M_D/M_G$ of 0.80 or more wherein the $M_G$ is a maximum intensity of a peak for G band, and the $M_D$ is a maximum intensity of a peak for D band.

The porous carbon of the present invention, preferably has an $M_D/M_G$ of 0.80 or more in a Raman spectrum that plots the intensity of Raman scattering with respect to the wave number of Raman scattering, wherein the $M_G$ is a maximum intensity of a peak for G band, and the $M_D$ is a maximum intensity of a peak for D band. The maximum intensity $M_G$ of a peak for G band is the maximum of the peak intensity for G band of Raman scattering after subtracting the background, which is a noise, from the measured values in the wavenumber range constituting the peak for G band. The maximum intensity $M_D$ of a peak for D band is similarly determined. The peak for G band and the peak for D band are close to each other, and therefore the peak for G band and the peak for D band are separated by peak fitting using an appropriate function, such as a Lorentzian function, and then a maximum intensity $M_G$ and a maximum intensity $M_D$ can be determined. The $M_D/M_G$ is, more preferably 0.80 to 3.0, further preferably 0.90 to 1.5. By using the porous carbon of the present embodiment, a resin composition for producing a varistor element having appropriate varistor characteristics and a paste for forming a varistor element can be more surely obtained.

A method for producing the porous carbon of the embodiment of the present invention is described below.

<Production Method 1>

In Production method 1 for the porous carbon of the present embodiment, the porous carbon can be produced by thermal decomposition of a mixture of raw materials containing furfural and phloroglucinol.

(Step of Providing Materials)

Production method 1 for the porous carbon of the present embodiment comprises the step of providing materials. In the step of providing materials, furfural and phloroglucinol in the predetermined amounts are first provided. In the porous carbon of the present embodiment, the amount of the furfural in the raw materials is preferably 100 to 500 parts by weight, more preferably 120 to 340 parts by weight, further preferably 160 to 310 parts by weight, relative to 100 parts by weight of the phloroglucinol.

(Pretreatment Step)

Production method 1 comprises the pretreatment step for dissolving phloroglucinol and furfural in ethanol to obtain an ethanol solution. In the pretreatment step, phloroglucinol is first dissolved in ethanol. Then, furfural is dissolved in the ethanol solution of phloroglucinol. In the dissolution, with respect to the amount of ethanol, ethanol can be used in such an amount that the concentration of the total of phloroglucinol and furfural in the ethanol solution becomes 1 to 45% by weight, preferably 1.5 to 30% by weight, more preferably 2 to 25% by weight. In Production method 1, the concentration of the total of phloroglucinol and furfural in the ethanol solution in the pretreatment step (raw material concentration in the solvent) is referred to as "initial concentration (% by weight)".

(Gelling Step)

Production method 1 comprises the step of gelling the ethanol solution of phloroglucinol and furfural. In the gelling step, the above-obtained ethanol solution of phloroglucinol and furfural is stirred, and then allowed to stand at room temperature, then a gelled solid is obtained.

(Cleaning Step)

Production method 1 comprises the step of cleaning the gelled solid. In the cleaning step, the gelled solid is cleaned. In the cleaning, ethanol can be used, but the cleaning liquid is not limited to ethanol. Another alcohol can be used. In the cleaning, the gelled solid can be cleaned, for example, by repeatedly conducting the operation of adding ethanol to the gelled solid and discharging the added ethanol. The cleaning step can be performed until the discharged ethanol is not colored any more.

(Supercritical Drying Step)

Production method 1 comprises the supercritical drying step for the cleaned solid. The gelled solid obtained after being cleaned is removed and subjected to supercritical drying. Specifically, the gelled solid is placed in a sealed vessel, and supercritical liquid $CO_2$ under a predetermined pressure is introduced into the sealed vessel. Then, this state is maintained, and then the supercritical liquid $CO_2$ is discharged. If necessary, this step can be repeatedly conducted.

(Thermal Decomposition Step)

Production method 1 comprises the thermal decomposition step for the solid obtained after supercritical drying. In the thermal decomposition step, the above-obtained solid after supercritical drying is placed in a furnace, and the temperature is increased in a nitrogen gas atmosphere at a heating rate of 0.8 to 1.2 degree C./minute to 800 degree C. or higher (for example, 800 to 1500 degree C., preferably 800 to 1,200 degree C., more preferably 800 to 1000 degree C.). After completion of the temperature increase, that temperature is maintained for 5 to 60 minutes (preferably for 20 to 30 minutes), for performing thermal decomposition. As a result, the components other than carbon can be removed, and porous carbon is obtained.

(Pulverization Step)

Production method 1 comprises the step of pulverizing the porous carbon obtained in the thermal decomposition step so as to be in a particulate form. In the pulverization step, the heated porous carbon is cooled to room temperature, and the porous carbon is pulverized, for obtaining powdered porous carbon. In the pulverization step, the porous carbon can be pulverized so that the porous carbon has a predetermined particle size. In the pulverization step, in view of the operating properties and others, the average particle size of the porous carbon is preferably 0.01 to 50 μm, further preferably 0.02 to 10 μm. With respect to the average particle size, the cumulative 50% particle size of the all particles (average particle diameter: D50) can be the above-mentioned particle size. The average particle diameter D50 can be determined by conducting particle size distribution measurement by means of a laser diffraction/scattering-type particle diameter distribution measurement apparatus LA-960, manufactured by HORIBA, Ltd. (laser diffraction/scattering method), and a D50 value from the results of the particle size distribution measurement can be obtained.

Thus, the porous carbon can be produced by Production method 1.

<Production Method 2>

In Production method 2 for the porous carbon of the present embodiment, the porous carbon can be produced by thermal decomposition of a raw material containing a polyimide.

(Step of Providing Materials)

Production method 2 for the porous carbon of the present embodiment comprises the step of providing materials. In the step of providing materials, pyromellitic anhydride and paraphenyldiamine in the predetermined amounts are provided.

(Pretreatment Step)

Production method 2 comprises the pretreatment step for synthesizing a polyimide solution. In the pretreatment step of Production method 2, a polyamic acid solution can be first synthesized using pyromellitic anhydride and paraphenyldiamine as materials. In the synthesis, dimethylacetamide and toluene can be used as a solvent. The total weight of the solvents (dimethylacetamide and toluene) relative to the total weight of pyromellitic anhydride and paraphenyldiamine can be selected so that the initial concentration of the polyamic acid solution synthesized becomes in a predetermined range. In Production method 2, the initial concentration (% by weight) means a concentration of polyamic acid in the polyamic acid solution in the pretreatment step (the ratio of the total weight of pyromellitic anhydride and paraphenyldiamine which are raw materials to the weight of the polyamic acid solution after synthesized). The initial concentration is 1 to 45% by weight, preferably 1.5 to 30% by weight, more preferably 2 to 25% by weight, further preferably 10 to 15% by weight. Synthesis of polyamic acid solution can be conducted by mixing and heating pyromellitic anhydride and paraphenyldiamine. As a result, a polyamic acid solution can be synthesized. Subsequently, pyridine and acetic anhydride in the predetermined amounts are added to the above-obtained polyamic acid solution, and a polyimide solution can be synthesized.

(Gelling Step)

Production method 2 comprises the step of gelling the polyimide solution. In the gelling step, the above-obtained polyimide solution is stirred. Then, the solution is allowed to stand at room temperature, and a gelled solid is obtained.

(Cleaning Step, Supercritical Drying Step, Heating Step, and Pulverization Step)

Production method 2 comprises the cleaning step, supercritical drying step, heating step, and pulverization step. In Production method 2, after the above-mentioned gelling step, the cleaning step, supercritical drying step, heating step, and pulverization step are conducted in the same manner as in Production method 1, and the porous carbon can be produced.

With respect to the porous carbon of the present embodiment, in the thermal decomposition step of production methods 1 and 2, the peak temperature of the thermal decomposition conducted when producing the porous carbon is 800 degree C. or higher, preferably 800 to 1500 degree C., more preferably 800 to 1200 degree C., further preferably 800 to 1000 degree C. When the peak temperature of the thermal decomposition is the predetermined temperature, a porous carbon that is to be contained in a resin composition and the like for producing a varistor element having appropriate varistor characteristics can be more surely obtained.

<Resin Composition>

The resin composition of the present embodiment is described below in detail. The resin composition of the present invention comprises the above-described porous carbon of the present embodiment and a resin. The resin composition of the present embodiment preferably contains an epoxy resin as the resin and a curing agent.

In the resin composition of the present embodiment, the epoxy resin preferably contains at least one selected from a bisphenol A epoxy resin, a brominated bisphenol A epoxy resin, a bisphenol F epoxy resin, a biphenyl epoxy resin, a novolak epoxy resin, an alicyclic epoxy resin, a naphthalene epoxy resin, an ether epoxy resin, a polyether epoxy resin, and a silicone-epoxy copolymer resin.

When the resin composition contains a predetermined epoxy resin, a varistor element in which the materials for the varistor element have been appropriately cured can be produced.

The resin composition of the present embodiment preferably contains an amine compound, phenol, an acid anhydride, an imidazole compound, or a mixture thereof as a curing agent. When the resin composition, contains a predetermined curing agent, the epoxy resin can be appropriately cured upon producing a varistor element.

The curing agent contained in the resin composition of the present embodiment preferably contains imidazole. As an imidazole compound, for example, imidazole or an imidazole derivative can be used. In the varistor element containing porous carbon, when containing an imidazole compound, particularly imidazole as a curing agent, a varistor element having more excellent varistor characteristics, specifically having a high non-linear coefficient α can be obtained. Further, when the curing agent contains both an imidazole compound (particularly imidazole) and an amine compound other than the imidazole compound, a varistor element having a higher non-linear coefficient α can be obtained.

With respect to the amine compound other than the imidazole compound, an amine compound selected from an aliphatic amine, an alicyclic amine, an aromatic amine, 3,3'-diethyl-4,4'-diaminodiphenylmethane, and diethyltoluenediamine can be used. Particularly, as an amine compound, 3,3'-diethyl-4,4'-diaminodiphenylmethane (which is commercially available as aromatic amine curing agent "KAYAHARD A-A" (manufactured by Nippon Kayaku Co., Ltd.)) and/or diethyltoluenediamine (which is commercially available as "ETHACURE", manufactured by Albemarle Corporation) can be preferably used.

When the curing agent contained in the resin composition of the present embodiment contains an imidazole compound, the amount of the imidazole compound contained in the resin component is preferably 1 to 20% by weight. When the imidazole compound is incorporated in a predetermined amount, a varistor element having a high non-linear coefficient α can be surely obtained.

The resin composition of the present invention preferably contains 0.5 to 10 parts by weight of the above-mentioned porous carbon of the present embodiment, relative to 100 parts by weight of the total of the epoxy resin and the curing agent. When the resin composition contains a predetermined amount of the porous carbon, a varistor element having appropriate varistor characteristics can be obtained.

It is preferred that the resin composition of the present embodiment and the below-mentioned paste for forming a varistor element do not contain an inorganic component other than the porous carbon (such as a filler), namely, they are filler-less. In the case of using the resin composition of the present embodiment, even when the resin composition and the paste for forming a varistor element have such a simple configuration that does not contain an inorganic component, such as a filler, a varistor element having appropriate varistor characteristics can be produced.

<Paste for Forming a Varistor Element>

A paste for forming a varistor element can be obtained by using the above-described resin composition of the present embodiment. The resin composition of the present invention can be used as a paste for forming a varistor element as it is. However, from the viewpoint of achieving excellent application of the paste in screen printing and the like, the paste for forming a varistor element can further contain a solvent and other additives.

The paste for forming a varistor element in the present embodiment can further contain a solvent. Examples of solvents include aromatic hydrocarbons, such as toluene and xylene; ketones, such as methyl ethyl ketone, methyl isobutyl ketone, and cyclohexanone; ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, and esters, such as the corresponding acetates thereof; terpineol, and the like. The solvent is preferably incorporated in an amount of 2 to 10 parts by weight, relative to 100 parts by weight of the above-mentioned resin composition (the total of the epoxy resin, curing agent, and porous carbon).

The paste for forming a varistor element in the present embodiment can further contain at least one selected from the group consisting of coloring agents, such as an inorganic pigment and an organic pigment, an ion trapping agent, a flame retardant, a silane coupling agent, a leveling agent, a thixotropic agent, an elastomer, a curing accelerator, a metal complex, a dispersant, and an anti-foaming agent.

The paste for forming a varistor element in the present embodiment can be produced by charging the above-mentioned epoxy resin, curing agent, and predetermined porous carbon, and optionally other components, such as a solvent, into a mixing machine, such as a planetary stirring machine, a dissolver, a bead mill, a grinding kneader, a three-roll mill, a rotary mixer, or a twin-screw mixer, and mixing these components. Thus, a resin composition suitable for producing a varistor element can be produced. A paste for forming a varistor element having a viscosity suitable for screen printing, dipping, or other desired coating film or wiring formation method can be prepared from the paste for forming a varistor element of the present embodiment.

A varistor element having appropriate varistor characteristics can be produced by applying the above-mentioned paste for forming a varistor element in the present embodiment to a predetermined electrode so as to be in contact with the electrode, and curing the paste. Examples of application methods include screen printing and dipping.

By the present embodiment of the present invention, a varistor element having appropriate varistor characteristics can be obtained.

EXAMPLES

As described below, the embodiment of the present invention will be described in detail with reference to the following Examples, which should not be construed as limiting the scope of the present invention.

<Production of Porous Carbon>

The method for producing the porous carbon used in the Examples of the present invention and Comparative Examples is first described. The materials and production conditions used in producing the porous carbon used in the Examples and Comparative Examples are shown in Tables 1 and 2. The porous carbon in Examples 2 to 4 and Comparative Examples 1 to 4 was produced by Production method 1 using furfural and phloroglucinol as materials (raw materials). The porous carbon in Example 1 and Comparative Example 5 was produced by Production method 2 using pyromellitic acid and paraphenyldiamine as main materials (raw materials).

<Production Method 1: Method for Producing the Porous Carbon in Examples 2 to 4 and Comparative Examples 1 to 4>

The amounts of the incorporated materials for the porous carbon in Examples 2 to 4 are shown in Table 1, and the amounts of the incorporated materials for the porous carbon in Comparative Examples 1 to 4 are shown in Table 2.

(Step of Providing Materials)

In the method for producing the porous carbon in Examples 2 to 4 and Comparative Examples 1 to 4 (Production method 1), furfural and phloroglucinol in the predetermined amounts shown in Tables 1 and 2 were first provided.

(Pretreatment Step)

Then, phloroglucinol was dissolved in ethanol. Then, furfural was dissolved in, the ethanol solution of phloroglucinol. In the dissolution, ethanol was used in such an amount that the total weight of phloroglucinol and furfural was to be the initial concentration shown in Tables 1 and 2. In Production method 1, the initial concentration (% by weight) means a concentration of the total of phloroglucinol and furfural in the ethanol solution. (raw material concentration in the solvent).

(Gelling Step)

Then, the above-obtained ethanol solution of phloroglucinol and furfural was stirred. Then, the solution was allowed to stand at room temperature, making it possible to gel the solution.

(Cleaning Step)

Then, the gelled solid was cleaned. In the cleaning, ethanol was used. The gelled solid was cleaned by repeatedly conducting the operation of adding ethanol to the gelled solid and discharging the added ethanol. The cleaning was performed until the discharged ethanol was not colored any more.

(Supercritical Drying Step)

Then, the gelled solid obtained after being cleaned was removed and subjected to supercritical drying. Specifically, the solid material was placed in a sealed vessel, and supercritical liquid $CO_2$ was introduced into the sealed vessel. Then, this state was maintained for a predetermined period of time, and then the supercritical liquid $CO_2$ was discharged. Supercritical drying was made by repeatedly conducting the operation of introducing supercritical liquid $CO_2$ and discharging the $CO_2$.

(Thermal Decomposition Step)

The above-obtained solid after supercritical dry ng was placed in a furnace, and the temperature was increased in a nitrogen gas atmosphere at a heating rate of 1 degree C./minute to 800 degree C. or higher in the case of the Examples (specifically, the temperature shown in Tables 1 and 2), and thermal decomposition was achieved. After completion of the temperature increase, that temperature was maintained for 30 minutes. As a result, the components other than carbon were able to be removed, and porous carbon was obtained.

(Pulverization Step)

The heated porous carbon was cooled to room temperature and pulverized, and porous carbon in Examples 2 to 4 and Comparative Examples 1 to 4 was obtained.

<Production Method 2: Method for Producing the Porous Carbon in Example 1 and Comparative Example 5>

The amounts of the incorporated materials for the porous carbon in Example 1 are shown in Table 1, and the amounts of the incorporated materials for the porous carbon in Comparative Example 5 are shown in Table 2.

(Step of Providing Materials)

In the method for producing the porous carbon in Example 1 and Comparative Example 5 (Production method 2), pyromellitic acid and paraphenyldiamine in the predetermined amounts shown in Tables 1 and 2 were first provided.

(Pretreatment Step)

Then, a polyamic acid solution was synthesized using pyromellitic acid and paraphenyldiamine as materials. In the synthesis, as a solvent, solvents (dimethylacetamide and toluene) were used in such a weight that the total weight of pyromellitic anhydride and paraphenyldiamine which are raw materials in the polyamic acid solution corresponded to the initial concentration shown in Tables 1 and 2. A mixed solvent of dimethylacetamide and toluene was used the solvent. Synthesis of polyamic acid solution was conducted by mixing and heating pyromellitic acid and paraphenyldiamine. As a result, a polyamic acid solution was able to be synthesized. Subsequently, pyridine and acetic anhydride were added to the above-obtained polyamic acid solution in the predetermined amounts shown in Tables 1 and 2. As a result, a polyimide solution was able to be obtained.

(Gelling Step)

Then, the polyimide solution was stirred. Then, the solution was allowed to stand at room temperature, and a gelled solid was obtained.

(Other Steps)

Then, the cleaning step, supercritical drying step, thermal decomposition step, and pulverization step were conducted in the same manner as in Production method 1, and porous carbon in Example 1 and Comparative Example 5 was produced. The temperature after the temperature increase in the heating step was the temperature shown in Tables 1 and 2.

The pulverization step was conducted so that the porous carbon in the Examples and Comparative Examples had an average particle size D50 of 25 nm.

<Scanning Electron Microscope (SEM) Micrograph>

Figure 3:
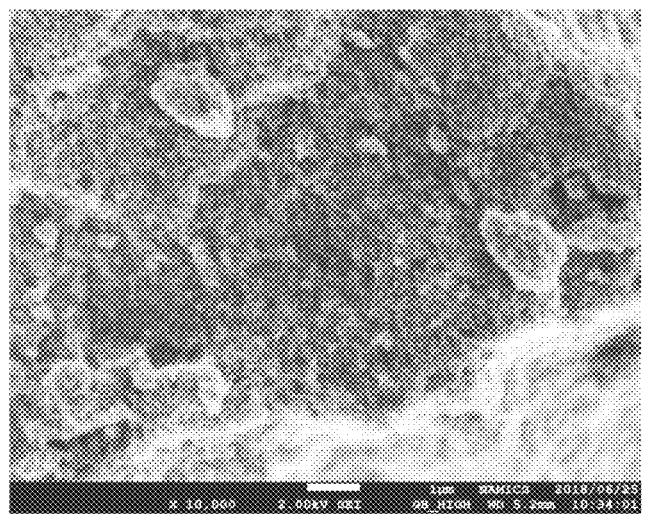
FIG. 3 is a SEM micrograph (magnification: 10000 times) of the porous carbon in Example 1 of the present invention.
Figure 4:
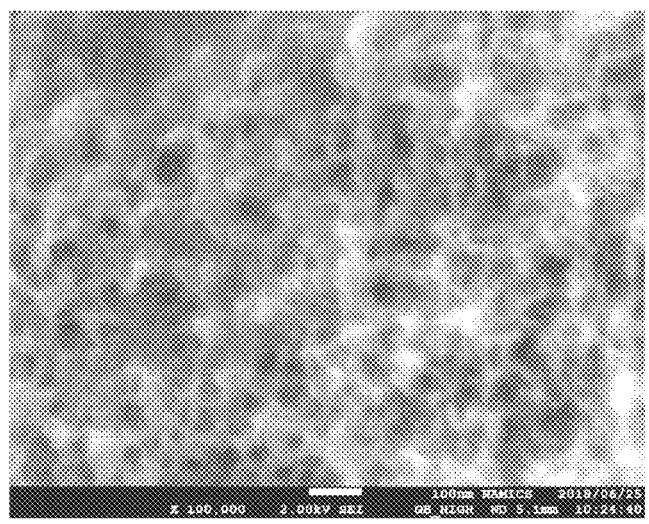
FIG. 4 is a SEM micrograph (magnification: 100000 times) of the porous carbon in Example 1 of the present invention.
Figure 5:
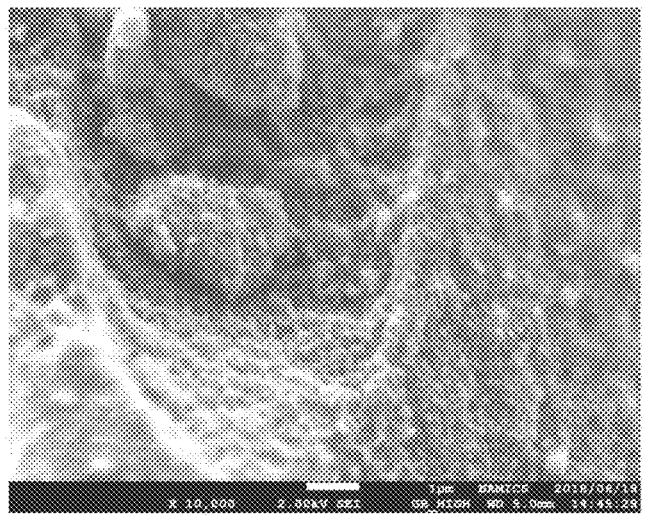
FIG. 5 is a SEM micrograph (magnification: 10000 times) of the porous carbon in Example 2 of the present invention.
Figure 6:
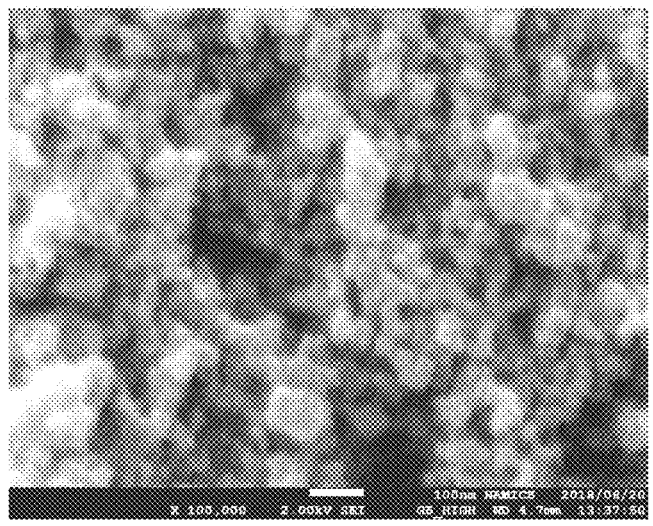
FIG. 6 is a SEM micrograph (magnification: 100000 times) of the porous carbon in Example 2 of the present invention.
Figure 7:
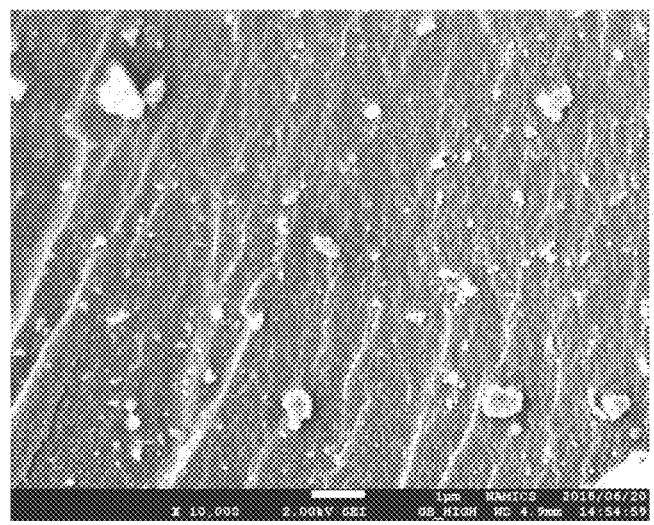
FIG. 7 is a SEM micrograph (magnification: 10000 times) of the porous carbon in Comparative Example 2.
Figure 8:
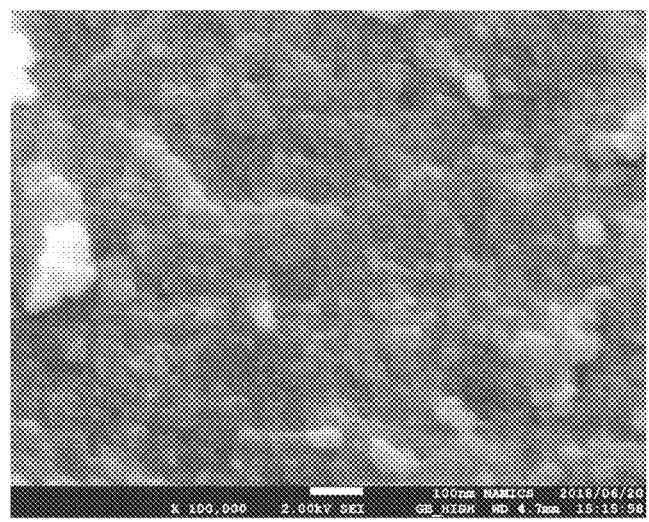
FIG. 8 is a SEM micrograph (magnification: 100000 times) of the porous carbon in Comparative Example 2.

FIGS. 3 to 8 shows scanning electron microscope (SEM) micrographs of the surface of the porous carbon obtained as mentioned above in Examples 1 and 2 and Comparative Example 2. The SEM micrographs in Example 1 are shown in FIG. 3 (magnification: 10000 times) and FIG. 4 (magnification: 100000 times). The SEM micrographs in Example 2 are shown in FIG. 5 (magnification: 10000 times) and FIG. 6 (magnification: 100000 times). The SEM micrographs in Comparative Example 2 are shown in FIG. 7 (magnification: 10000 times) and FIG. 8 (magnification: 100000 times). As can be seen in the SEM micrographs in Examples 1 and 2, a number of pores of less than 1 µm are present. In contrast, in the SEM micrographs in Comparative Example 2, a number of pores of less than 1 µm are not present, and the surface appears to be relatively smooth.

<Measurement by Raman Spectroscopy>

Figure 9:
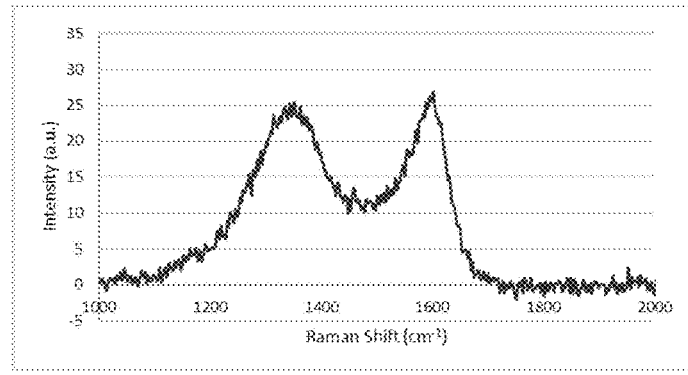
FIG. 9 is a Raman spectrum of the porous carbon in Example 1 of the present invention.
Figure 10:
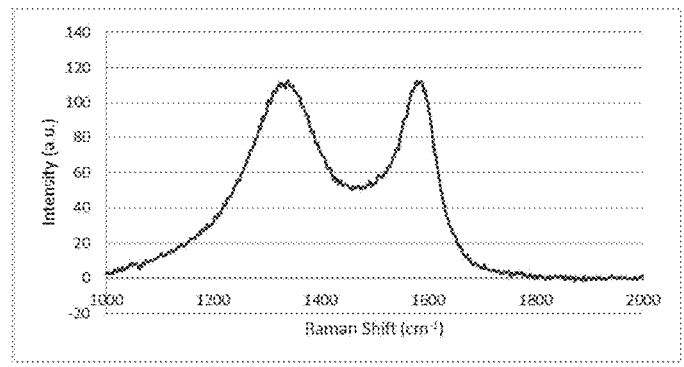
FIG. 10 is a Raman spectrum of the porous carbon in Example 2 of the present invention.
Figure 11:
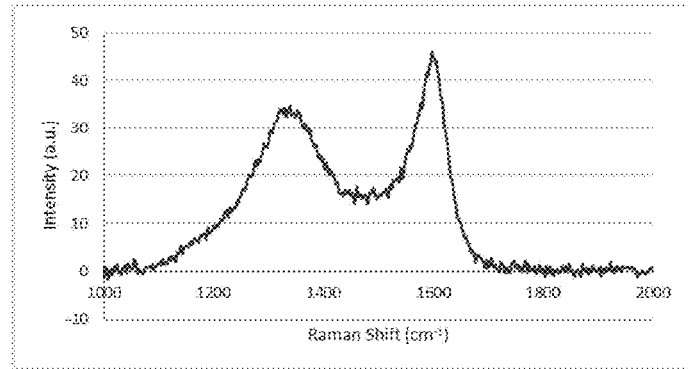
FIG. 11 is a Raman spectrum of the porous carbon in Comparative Example 2.

Raman spectra of the porous carbon obtained as mentioned above in the Examples and Comparative Examples were obtained by measurement of Raman spectroscopy. FIGS. 9 to 11 show the Raman spectra in Example 1, Example 2, and Comparative Example 2, respectively. In FIGS. 9 to 11, the horizontal axis indicates a Raman shift (unit: $cm^{-1}$), and the vertical axis indicates a signal intensity (arbitrary unit) of a Raman scattered light.

As a measurement apparatus for Raman spectroscopy, "Cora 7100" (manufactured by Anton Paar GmbH) was used. The emitted laser had a wavelength of 532 nm and an intensity of 50 mW, and the measurement time was 60 seconds. As can be seen from FIGS. 9 to 11, a peak for G band around 1590 $cm^{-1}$ and a peak for D band around 1350 $cm^{-1}$ were observed in the Raman spectra. If necessary, processing, such as subtraction of the background from the obtained signal, can be made.

From the Raman spectrum obtained by the measurement made by Raman spectroscopy, an accumulated intensity $I_G$ of a peak for G band around 1590 $cm^{-1}$ and an accumulated intensity $I_D$ of a peak for D band around 1350 $cm^{-1}$ were determined, and a ratio of the accumulated intensities of G band and D band ($I_D/I_G$) was determined. The ratios of the accumulated intensities of G band and D band ($I_D/I_G$) of the porous carbon in the Examples and Comparative Examples are shown in Tables 1 and 2.

Similarly, the measurement was made by Raman spectroscopy, a maximum intensity $M_G$ of a peak for G band and a maximum intensity $M_D$ of a peak for D band were obtained from the obtained Raman spectrum, and a ratio of the maximum intensities of the peaks for G band and D band ($M_D/M_G$) was determined. The ratios of the maximum intensities of the peaks for G band and D band ($M_D/M_G$) in the Examples and Comparative Examples are shown in Tables 1 and 2.

<Materials for the Resin Composition and Formulation of the Materials>

The materials used for the resin composition in the Examples and Comparative Examples are as follows. The formulations of the materials in the Examples and Comparative Examples are shown in Tables 1 and 2.

(Epoxy Resin)

The epoxy resin used in the Examples and Comparative Examples is an epoxy resin which is a mixture of a bisphenol F epoxy resin (grade "YDF-8170", manufactured by Nippon Steel & Sumikin Chemical Co., Ltd.) (80% by weight) and a bisphenol A epoxy resin ("1001", manufactured by Mitsubishi Chemical Corporation) (20% by weight).

(Curing Agent)

A mixture of an amine curing agent and an imidazole curing agent was used as a curing agent in the resin composition in the Examples and Comparative Examples.

As an amine curing agent, "KAYAHARD A-A (HDAA)" (3,3'-diethyl-4,4'-diaminodiphenylmethane), manufactured by Nippon Kayaku Co., Ltd., was used.

As an imidazole curing agent, "2P4MHZ-PW", manufactured by Shikoku Chemicals Corporation, was used.

(Formulation of the Epoxy Resin and Curing Agent)

The formulation of the epoxy resin and curing agent (total: 100% by weight) has 67.63% by weight of the epoxy resin, 25.61% by weight of the amine curing agent, and 6.76% by weight of the imidazole curing agent.

(Porous Carbon (Carbon Aerogel))

In the resin composition of the Examples and Comparative Examples, 5 parts by weight of the porous carbon relative to 100 parts by weight of the amount of the incorporated epoxy resin and curing agent was used.

(Other Components)

In the resin composition in the Examples and Comparative Examples, addition to the epoxy resin, curing agent, and porous carbon, 0.50 part by weight of a silane coupling agent (Shin-Etsu Silicone KBM-403, manufactured by Shin-Etsu Chemical Co., Ltd.) and 0.25 part by weight of a dispersant (HIPLAAD ED-451, manufactured by Kusumoto Chemicals Ltd.) relative to 100 parts by weight of the amount of the incorporated epoxy resin and curing agent were used.

Then, the epoxy resin, curing agent, porous carbon, silane coupling agent, and dispersant in the above-mentioned formulation were mixed by a planetary mixer, and further dispersed by a three-roll mill to form a paste, and a paste for forming a varistor element was produced.

<Preparation of a Varistor Element>

Substrate 12 having electrodes 14a and 14b in a comb-like form as shown in FIG. 1 was used. A multilayer printed wiring hoard (having a copper foil) with FR-4 as a material was used as a substrate. The copper foil of the multilayer printed wiring board was patterned to form electrodes 14a and 14b.

Then, as shown in FIG. 2, the above-produced resin composition in the Examples and Comparative Examples was screen-printed so as to cover electrodes 14a and 14b in a comb-like form formed on the surface of substrate 12, and the epoxy resin was cured. The epoxy resin was cured by maintaining the resin at a temperature of 165 degree C. for 2 hours. The all cured epoxy resin had a thickness of 90 μm. Thus, the varistor elements in the Examples and Comparative Examples were prepared.

<Measurement of Current-Voltage Characteristics of a Varistor Element and Determination of a Non-Linear Coefficient α>

Current-voltage characteristics of the above-prepared varistor element in the Examples and Comparative Examples were measured. Specifically, current-voltage characteristics of the varistor element were measured by applying a predetermined voltage to a pair of electrodes (electrode 14a and electrode 14b) of the varistor element, and measuring a value of a current flowing the electrodes at that time.

<Determination of a Non-Linear Coefficient α>

The current-voltage characteristics of the varistor element can be approximated by $I=K \cdot V^{\alpha}$, wherein K is a constant and α is a non-linear coefficient. From the current-voltage characteristics of the varistor element, a non-linear coefficient α was determined by fitting. The results of the determination of non-linear coefficient α of the varistor elements in the Examples and Comparative Examples are shown in Tables 1 and 2. When a varistor element has a non-linear coefficient α of 6 or more, the varistor element is considered to have appropriate varistor characteristics that can be used as a varistor element.

As apparent from Tables 1 and 2, the non-linear coefficient α in all of Examples 1 to 4 of the present invention was 6 or more. This result shows that a varistor element having appropriate varistor characteristics for using as a varistor element can be produced by using the resin composition comprising the porous carbon according to the embodiment of the present invention, in which the ratio of accumulated intensity $I_G$ of a peak for G band and accumulated intensity $I_D$ of a peak for D band ($I_D/I_G$) is 2.0 or more in a Raman spectrum of the porous carbon. Further, in the Raman spectra of the porous carbon in Examples 1 to 4 of the present invention, the ratio of maximum intensity $M_G$ of a peak for G band and maximum intensity $M_D$ of a peak for D band ($M_D/M_G$) was 0.80 or more.

In contrast, the non-linear coefficient α was 2.2 or less in all of Comparative Examples 1 to 5, and the varistor elements did not have appropriate varistor characteristics for using as a varistor element. Further, the ratio of accumulated intensity $I_G$ of a peak for G band and accumulated intensity $I_D$ of a peak for D band ($I_D/I_G$) of the porous carbon in Comparative Examples 1 to 5 was less than 2. Further, with respect to the porous carbon in Comparative Examples 1 to 5, the ratio of maximum intensity $M_G$ of a peak for G band and maximum intensity $M_D$ of a peak for D band ($M_D/M_G$) was less than 0.8.

As is apparent from the above, a varistor element having appropriate varistor characteristics for using as a varistor element can be obtained by using the resin composition comprising the porous carbon according to the embodiment of the present invention with a predetermined Raman spectrum.

TABLE 1

| | | Example 1 | Example 2 | Example 3 | Example 4 |
|---|---|---|---|---|---|
| Materials for porous carbon (wt %) | Furfural | | 66.67 | 66.67 | 66.67 |
| | Phloroglucinol | | 33.33 | 33.33 | 33.33 |
| | Pyromellitic anhydride | 60.00 | | | |
| | Paraphenyldiamine | 25.71 | | | |
| | Pyridine | 4.26 | | | |
| | Acetic anhydride | 10.03 | | | |
| Production conditions | Initial concentration (wt %) | 12 | 10 | 4 | 20 |
| | Calcination temperature (degree C.) | 1000 | 1000 | 1000 | 800 |
| Raman measurement | Accumulated peak intensity ratio ($I_D/I_G$) | 2.183 | 2.401 | 2.42 | 2.259 |
| | Maximum peak intensity ratio ($M_D/M_G$) | 0.959 | 1.034 | 1.104 | 0.992 |
| Non-linear coefficient (α value) | | 6.5 | 7.2 | 7.1 | 6.7 |

TABLE 2

| | | Comparative Example 1 | Comparative Example 2 | Comparative Example 3 | Comparative Example 4 | Comparative Example 5 |
|---|---|---|---|---|---|---|
| Materials for porous carbon (wt %) | Furfural | 66.67 | 75.00 | 66.67 | 75.00 | |
| | Phloroglucinol | 33.33 | 25.00 | 33.33 | 25.00 | |
| | Pyromellitic anhydride | | | | | 60.00 |
| | Paraphenyldiamine | | | | | 25.71 |
| | Pyridine | | | | | 4.26 |
| | Acetic anhydride | | | | | 10.03 |

TABLE 2-continued

|  |  | Comparative Example 1 | Comparative Example 2 | Comparative Example 3 | Comparative Example 4 | Comparative Example 5 |
|---|---|---|---|---|---|---|
| Production conditions | Initial concentration (wt %) | 40 | 45 | 10 | 9 | 12 |
|  | Calcination temperature (degree C.) | 800 | 800 | 600 | 600 | 600 |
| Raman measurement | Accumulated peak intensity ratio ($I_D/I_G$) | 1.92 | 1.958 | 1.542 | 1.491 | 1.392 |
|  | Maximum peak intensity ratio ($M_D/M_G$) | 0.7304 | 0.799 | 0.666 | 0.684 | 0.655 |
| Non-linear coefficient ($\alpha$ value) |  | 2.0 | 2.2 | 1.8 | 1.9 | 2.0 |

DESCRIPTION OF REFERENCE NUMERALS

10: Varistor element
12: Substrate
14a, 14b: Electrode
16: Resin composition

The invention claimed is:

1. A porous carbon,
wherein the porous carbon has an $I_D/I_G$ of 2.0 or more in a Raman spectrum measured by Raman spectroscopy with respect to the porous carbon, wherein the $I_G$ is an accumulated intensity of a peak for G band around 1590 cm$^{-1}$, and the $I_D$ is an accumulated intensity of a peak for D band around 1350 cm$^{-1}$,
wherein the porous carbon has pores having a size of 200 nm or more and less than 1 μm, and
wherein the porous carbon is porous carbon for a varistor element.

2. The porous carbon according to claim 1, wherein the porous carbon has an $M_D/M_G$ of 0.80 or more, wherein the $M_G$ is a maximum intensity of a peak for the G band, and the $M_D$ is a maximum intensity of a peak for the D band.

3. The porous carbon according to claim 1, wherein a peak temperature of thermal decomposition when producing the porous carbon is 800 to 1500 degrees C.

4. The porous carbon according to claim 1, wherein the porous carbon is produced by thermal decomposition of a mixture of raw materials containing furfural and phloroglucinol.

5. The porous carbon according to claim 4, wherein an amount of the furfural in the raw materials is 100 to 500 parts by weight, relative to 100 parts by weight of the phloroglucinol.

6. The porous carbon according to claim 1, wherein the porous carbon is produced by thermal decomposition of a raw material containing a polyimide.

7. A resin composition comprising the porous carbon according to claim 1 and a resin.

8. A porous carbon particle,
wherein the porous carbon particle has an $I_D/I_G$ of 2.0 or more in a Raman spectrum measured by Raman spectroscopy with respect to the porous carbon particle, wherein the $I_G$ is an accumulated intensity of a peak for G band around 1590 cm$^{-1}$, and the $I_D$ is an accumulated intensity of a peak for D band around 1350 cm$^{-1}$,
wherein the porous carbon particle has pores having a size of 200 nm or more and less than 1 μm, and
wherein a particle size of the porous carbon particle is in a range of 0.01 to 50 μm.

9. The porous carbon particle according to claim 8, wherein the particle size of the porous carbon particle is in a range of 0.02 to 10 μm.

10. The porous carbon particle according to claim 8, wherein the porous carbon particle has an $M_D/M_G$ of 0.80 or more, wherein the $M_G$ is a maximum intensity of a peak for the G band, and the $M_D$ is a maximum intensity of a peak for the D band.

11. A resin composition comprising the porous carbon particle according to claim 8 and a resin.

* * * * *